P. G. HOLLSTEIN
COCOA COOLER.
APPLICATION FILED FEB. 19, 1913.
1,065,448.
Patented June 24, 1913.
3 SHEETS—SHEET 1.
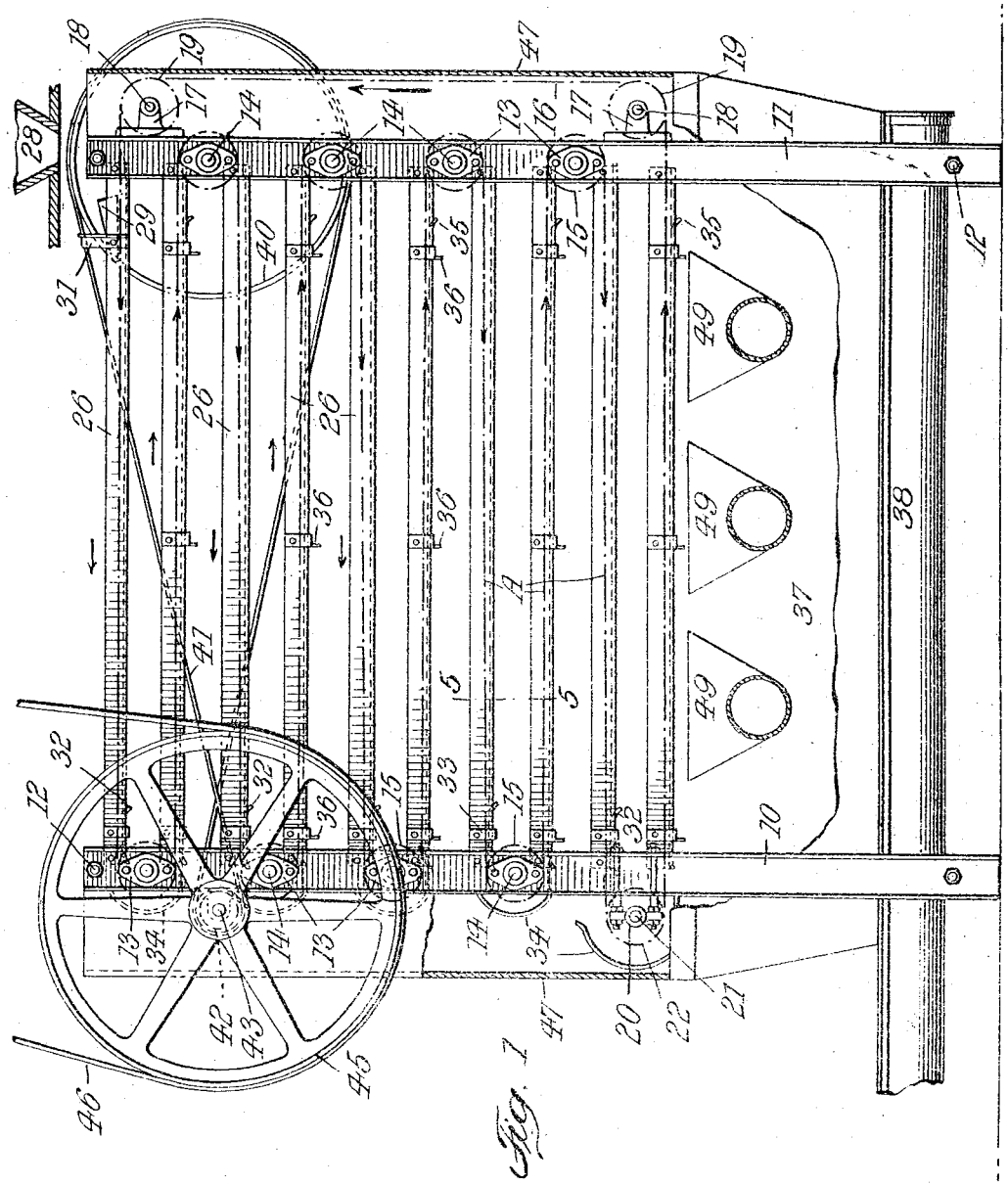

P. G. HOLLSTEIN.
COCOA COOLER.
APPLICATION FILED FEB. 19, 1913.
1,065,448.
Patented June 24, 1913.
3 SHEETS—SHEET 2.
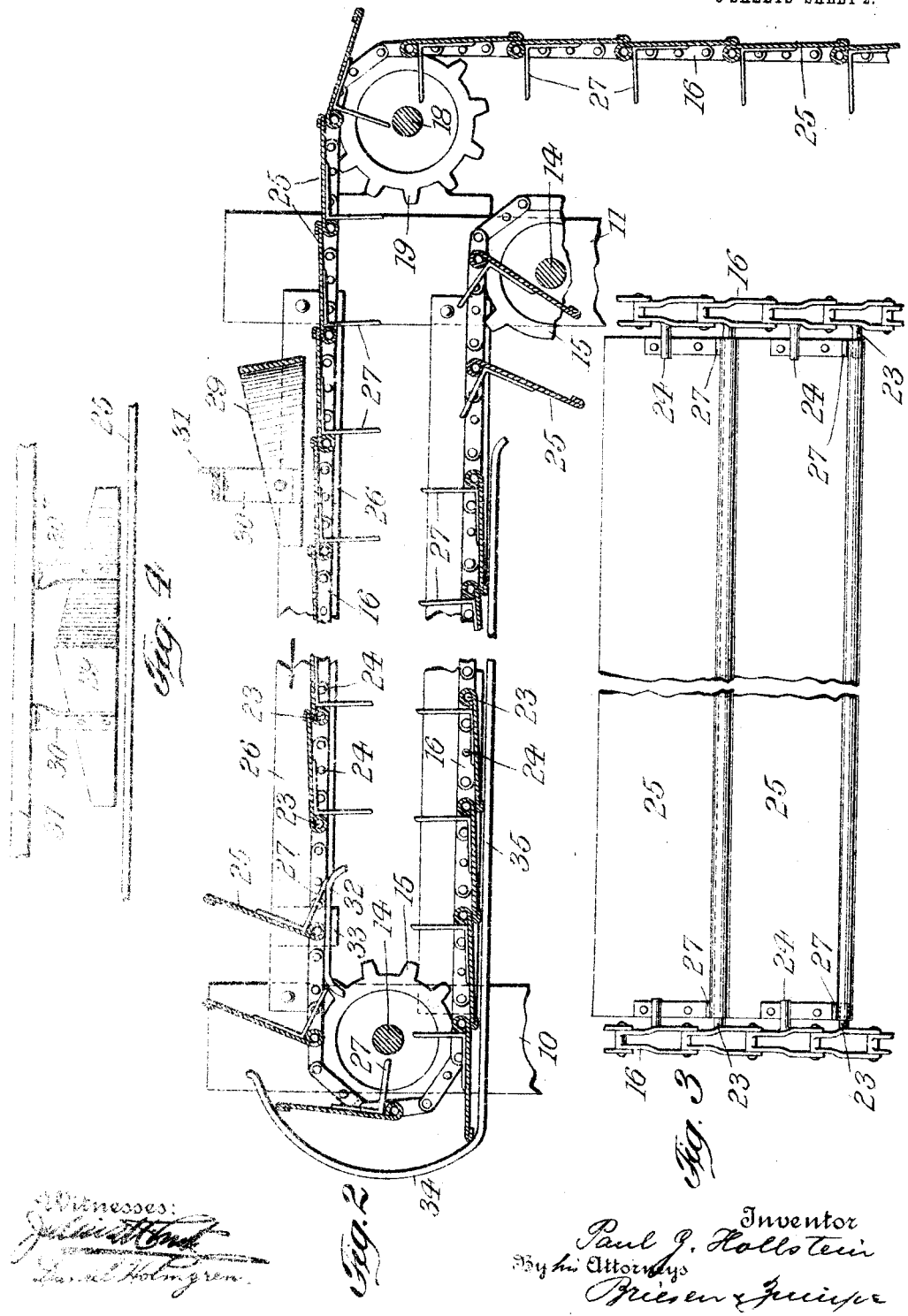
Witnesses:
Inventor
Paul G. Hollstein
By his Attorneys
Briesen & Knauth

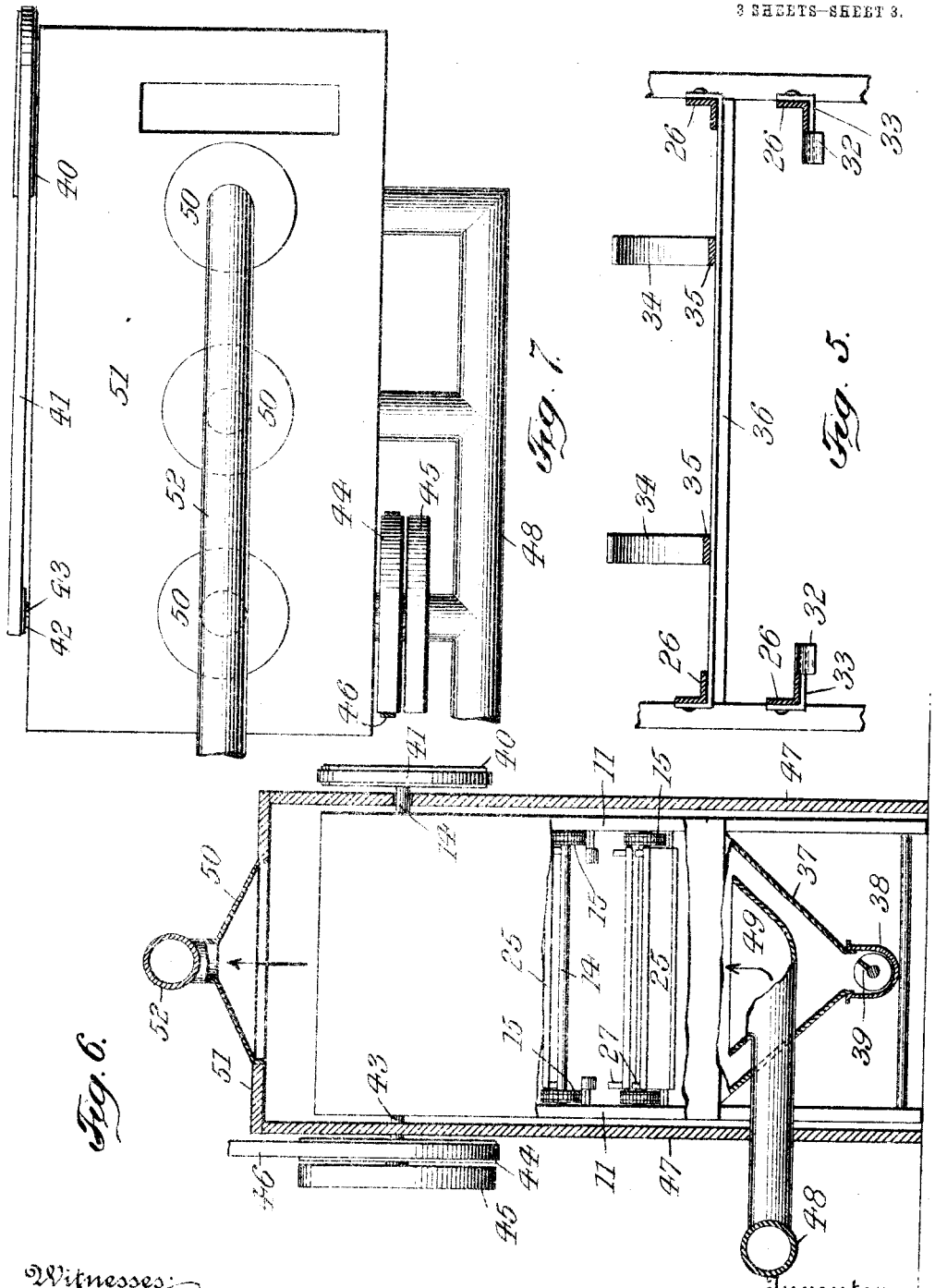

UNITED STATES PATENT OFFICE.

PAUL G. HOLLSTEIN, OF CARLSTADT, NEW JERSEY, ASSIGNOR TO J. M. LEHMANN COMPANY, OF NEW YORK, N. Y., A CORPORATION.

COCOA-COOLER.

1,065,445.  Specification of Letters Patent.  Patented June 24, 1913.

Application filed February 19, 1913.  Serial No. 749,330.

*To all whom it may concern:*

Be it known that I, PAUL G. HOLLSTEIN, a citizen of Germany, residing at Carlstadt, county of Bergen, and State of New Jersey, have invented a new and Improved Cocoa-Cooler, of which the following is a specification.

This invention relates to a cooler of novel construction which is more particularly adapted for effectively and uniformly reducing the temperature of cocoa after the latter has been heated to a comparatively high degree for the purpose of imparting thereto a desirable dark color. Because of the fact that the cocoa beans are subjected to various operations, such as grinding, cleaning, extracting the cocoa oil, etc., the resulting powder is of an objectionable light color. To impart to this cocoa powder the desirable dark color, it is heated to a considerable extent, whereupon it is again gradually cooled off without however being subjected to mechanical attacks, such as grinding, pressing, etc., while any lumps formed are nevertheless broken up.

In the accompanying drawing: Figure 1 is a side view partly in section of a cocoa cooler embodying my invention; Fig. 2 an enlarged vertical section through part of the conveyer run; Fig. 3 a detail bottom view of part of the conveyer proper; Fig. 4 a front view of the cocoa spreader and connected parts; Fig. 5 a cross section through the conveyer-supporting means on line 5—5, Fig. 1; Fig. 6 an end view partly in section of the incased cooler and the air circulating means, and Fig. 7 a top view of Fig. 6.

Briefly stated, my improved cocoa cooler comprises essentially an endless conveyer which is so conducted as to form a multitude of horizontal zig-zag runs A arranged above one another, provision being made for automatically dropping the cocoa from each run near the end thereof upon the run next below. In this way, the hot cocoa is repeatedly carried back and forth while gradually descending within the apparatus until discharged from the lowermost run, during which operation it is subjected to the action of a cooling air current, as hereinafter more fully described.

For supporting the conveyer, two pairs of uprights 10, 11 are provided, the uprights of each pair being connected by suitable tie rods 12. Uprights 10 and 11 are furnished with a plurality of bearings 13 within which transverse shafts 14 are journaled, the shafts of uprights 10 breaking line with those of uprights 11 as clearly illustrated in Fig. 1. In close proximity to the uprights, each shaft 14 is provided with relatively fixed sprocket wheels 15 adapted for the support of endless chains 16. In addition to the above bearings 13, uprights 11 have laterally extending bearings 17 supporting shafts 18 to which sprocket wheels 19 are secured that are also engaged by chains 16. In order to tighten the latter up from time to time, laterally adjustable bearings 20 are secured to uprights 10 for supporting a shaft 21 and sprocket wheels 22. The alternating links of chains 16 are provided at their middle with inwardly projecting pins 23, 24 respectively, of which the pins 23 constitute pivots for the conveyer blades or flaps 25. The latter are of such a length as to slightly overlap each other, thus constituting a moving platform during the horizontal zig-zag runs of the conveyer (Fig. 2). In order to prevent an objectionable sagging of the conveyer, chains 16 are supported at their horizontal runs upon longitudinal guide rails 26 that are secured to posts 10 and 11 by rivets or otherwise. To blades 25 are secured near the ends thereof, a pair of arms 27 extending at right angles to said blades, said arms being of a length to engage the pins 24 of those chain links that are located intermediate the pins supporting the conveyer blades.

During the runs toward the left (Figs. 1 and 2), each blade 25 rests upon the adjoining blade, the cocoa, to be cooled being supplied to the top run near the right end thereof through a suitable feed hopper 28. In order to uniformly distribute the cocoa across the entire width of the conveyer, a wedge shaped spreader 29 is arranged a slight distance above blades 25 (Figs. 3 and 4). This spreader is shown to be secured by hangers 30 to a cross frame 31 which is in turn attached to the top rails 26. After the heated cocoa thus supplied to and evenly distributed upon the conveyer-blades has nearly reached the left end of the top run, blades 25 are swung upward, so that the cocoa will drop upon the conveyer run next below (Fig. 2). For effecting this tilting movement of the blades, short cams 32 are secured to inwardly extending brackets 33 of the top rails 26.

These rails are arranged in the path of the arms 27 of the conveyer blades and cause the desired temporary tilting of the latter, while at the same time the pins 24 by engaging said arms, will prevent an accidental overthrow of blades 25. Exteriorly to the left sprocket wheels 15, curved guards 34 are provided that are engaged by the conveyer blades and assist in preventing any undesired disarrangement of the same. In order to maintain the blades in their substantially horizontal position while traveling from the left toward the right (Figs. 1 and 2) supporting rails 35 are provided upon which the blades ride during such movement. Rails 35 are preferably made integral with guards 34 and are supported by traverses 36 secured to rails 26. As clearly illustrated in Fig. 2, rails 35 terminate at a distance from the right hand sprocket wheels 15, so that the blades will lose their support and swing down by their own weight to discharge the cocoa upon the run below that travels in the opposite direction, the operation described being repeated for the remainder of the runs. From the bottom run, the cocoa is finally discharged through a tapering chute 37 into a trough 38 from which it is removed by a suitable screw conveyer 39 to be fed to the place of further treatment.

Power may be supplied to the conveyer described in any suitable manner, the drawing showing one of the shafts 14 provided with a pulley 40 which is by belt 41 connected to a pulley 42 of a counter shaft 43. The latter carries fast and loose pulleys 44, 45 which are adapted to be engaged by a driving belt 46.

In order to increase the cooling effect of the device, cold air is continuously blown therethrough, for which purpose the cooler is incased as at 47. The cold air is supplied from a suitable blower (not shown) to a feed pipe 48 which is shown to terminate in three flaring mouth pieces 49 arranged within chute 37. After the air has risen through the cooler, it is discharged through suitable hoods 50 provided in the case cover 51 and opening into a discharge pipe 52.

It will be seen that by the construction described, the heated cocoa is gradually cooled while traversing a comparatively extended path without being subjected to any mechanical grinding or other objectionable operations. Owing to the drop of the cocoa from run to run, all lumps will be effectively broken up, so that a finely divided powder of the desired dark color will result.

I claim:

1. In a cocoa cooler, a pair of endless chains having a plurality of zig-zag runs, conveyer blades pivotally suspended between said chains, arms on said blades, supporting rails adapted to be engaged by the blades, and cams adapted to be engaged by the arms.

2. In a cocoa cooler, a pair of endless chains having a plurality of zig-zag runs, axially alined pins projecting inwardly from the chains, conveyer blades turnable on said pins, arms on said blades, supporting rails adapted to be engaged by the blades, and cams adapted to be engaged by the arms.

3. In a cocoa cooler, a pair of endless chains having a plurality of zig-zag runs, axially alined pins projecting inwardly from the chains, conveyer blades turnable on alternating sets of said pins, arms on said blades that are adapted to engage the intermediate pins, supporting rails adapted to be engaged by the blades, and cams adapted to be engaged by the arms.

4. In a cocoa cooler, a pair of endless chains having a plurality of zig-zag runs, horizontal guide rails adapted to be engaged by said chains, conveyer blades pivotally suspended between said chains, arms on said blades, supporting rails adapted to be engaged by said blades for maintaining them in a substantially horizontal position, and cams adapted to be engaged by the blade-arms.

PAUL G. HOLLSTEIN.

Witnesses:
ARTHUR E. ZUMPE,
KATHERYNE KOCH.